Patented Oct. 1, 1929

1,729,697

UNITED STATES PATENT OFFICE

ANTON APOLD, OF VIENNA, AND HANS FLEISSNER, OF LEOBEN, AUSTRIA

PROCESS OF ROASTING IRON CARBONATE ORES

No Drawing.   Application filed November 28, 1924.   Serial No. 752,754.

It is known in connection with the reduction of ores containing iron to pass steam and air alternately through the heated charge or to reduce ores in an atmosphere of carbon dioxide. It is also known to heat spathic iron ore in contact with such quantity of hot air that iron peroxide but no lower oxides may be formed, the ore being heated with an oxidizing flame.

The process, according to the present invention, differs from the first mentioned known process in that it has for its object the thorough roasting and expelling of the carbon dioxide but it differs from the second mentioned process in that the carbon dioxide content is taken into consideration and the material to be roasted which is oxidized to ferrous oxide is capable of being further oxidized to ferric oxide. There is however so much heat liberated that the process may be termed exothermic. A flame is therefore not used in the present process and the quantities of heat required merely for balancing the heat losses are passed to the roasting chamber by introducing gases heated outside the furnace.

Moreover, the previous processes have the disadvantage that the material to be roasted is contaminated by fuel ash and by other substances originating from the fuels; furthermore, it is difficult to completely regulate the temperatures necessary for roasting the different materials. There is also the drawback, which should not be underrated, that when roasting carbonate ores, these are constantly surrounded by a carbon dioxide atmosphere so that in order to decompose the carbonates, a temperature must be applied which is considerably above the dissociation temperature at atmospheric pressure. Comparatively high temperatures must be used in the roasting of the ore if it is to be accelerated. All these drawbacks are obviated and the said advantages are attained by passing the quantities of gas necessary for the mere oxidation of the ore, together with further quantities of hot air, gases for heating, or steam through and over the ore in order to rapidly displace the carbon dioxide expelled from the ore particles and which prevent the latter from further oxidation and on the one hand to accelerate the roasting process and on the other to also utilize the heat which is liberated during the further oxidation of the ferrous oxide to higher oxides which is effected by the surplus of air and steam.

In order to regulate the temperature and composition of the hot gases passed over or through the ore, gases are mixed therewith which are at the same or another temperature and of the same or another kind.

Heated air and stem are chiefly used as gases which are passed over or through the material so that the material to be roasted does not come in contact either with the solid fuels and their residues or with a flame.

The surplus of gas supplied according to the invention effects on the one hand an acceleration of the roasting process as the carbon dioxide expelled when roasting is rapidly removed or constantly displaced by a roasting gas. On the other hand, the surplus air with the steam oxidizes the lower oxides into higher oxides, heat being liberated. The process can thus be operated at lower temperatures and with less consumption of fuel.

The quantities of heat, which are thus developed by the oxidation process, may also be utilized for bringing additional quantities of ore to the reaction temperature. Experiments have shown that the process requires very small quantities of heat supplied externally.

Carbonate iron ores, which have been roasted in the manner just described are greatly discolored, whereby a thorough manual separation is rendered possible.

Usually, the roasting with hot gases is carried out in a shaft furnace and the hot gases are introduced, forced under pressure or drawn into the roasting chamber of the furnace. The exact maintenance of the desired temperature is not only attainable by regulating the quantity of hot gases supplied but also by the addition of cold gases of the same or another kind, or by air. In some cases, steam has proven to be an efficacious gas either by being used alone or mixed with other gases, in which latter case it may also be produced by the injection of water. It is obvious that another type of furnace may also be used for carrying out the process.

The process, according to the present invention, has the following advantages: Prevention of any contamination of the material to be roasted by the fuels or their residues and products of combustion. A considerable saving of fuel owing to the possibility of utilizing low temperatures. Maintenance of certain temperatures during the roasting so that only that change is produced which is necessary for the further treatment. Owing to the low roasting temperature, prevention of the formation of lumps, sintered together, which can be reduced only with difficulty. Possibility of roasting fine ore in the shaft furnace. The possibility of considerably enriching or improving the metal by manual or magnetic separation.

What we claim is:

A process of roasting iron carbonate ores which comprises heating the ore with hot oxidizing gases to decompose the ore, and treating the heated ores, during the heating thereof, with additional quantities of an oxygen containing gas free of carbon dioxide to rapidly displace the carbon dioxide resulting from the decomposition and to further oxidize the iron to higher oxides.

In testimony whereof we hereunto affix our signatures.

Dr. HANS FLEISSNER.
Dr. ANTON APOLD.